United States Patent
Tamaru et al.

(10) Patent No.: US 7,911,495 B2
(45) Date of Patent: Mar. 22, 2011

(54) ELECTRONIC CONFERENCE SUPPORT DEVICE, ELECTRONIC CONFERENCE SUPPORT METHOD, AND INFORMATION TERMINAL DEVICE OF ELECTRONIC CONFERENCE SYSTEM

(75) Inventors: Eriko Tamaru, Kanagawa (JP); Motoyuki Takaai, Kanagawa (JP); Yuichi Ueno, Kanagawa (JP); Hitoshi Abe, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1146 days.

(21) Appl. No.: 11/550,898

(22) Filed: Oct. 19, 2006

(65) Prior Publication Data

US 2007/0263082 A1    Nov. 15, 2007

(30) Foreign Application Priority Data

Apr. 11, 2006  (JP) .................................. 2006-108266

(51) Int. Cl.
*H04N 7/14* (2006.01)
(52) U.S. Cl. ................ 348/14.07; 348/14.08; 348/14.12
(58) Field of Classification Search .... 348/14.01–14.16; 370/260–261; 715/753, 210, 804; 709/204
See application file for complete search history.

(56) References Cited

U.S. PATENT DOCUMENTS 5,694,544 A * 12/1997 Tanigawa et al. ............. 715/753
6,195,684 B1    2/2001 Watanabe et al.

FOREIGN PATENT DOCUMENTS

| EP | 0497022 | 4/1999 |
|---|---|---|
| JP | 10322331 | 12/1998 |
| JP | 2004094833 | 3/2004 |
| JP | 2006031359 | 2/2006 |
| WO | 2005029739 | 9/2004 |
| WO | 2005029739 | 3/2005 |

OTHER PUBLICATIONS

Chinese Office Action with English translation thereof, issued on Jan. 22, 2010, relating to corresponding Chinese Patent Application No. 200710003814.
Office Action issued by the Australian Patent Office on Apr. 30, 2008 for corresponding Australian Patent Application No. 2007200089.

* cited by examiner

*Primary Examiner* — Melur Ramakrishnaiah
(74) *Attorney, Agent, or Firm* — Gauthier & Connors LLP

(57) ABSTRACT

An electronic conference support device has a cut screen information management section that stores information related to a cut screen object which forms a portion of a screen image displayed on a presenter-side display unit; a screen image generation processor that generates a screen image based on stored information related to a cut screen object designated from among cut screen objects contained in a screen image displayed on a participant-side display unit, by incorporating the designated cut screen object into image data to be newly displayed on the participant-side display unit; and an edit screen information storage unit that stores, in association with each other, information related to the generated screen image and information related to the cut screen object incorporated into the screen image.

12 Claims, 13 Drawing Sheets

SHARED CUT SCREEN INFORMATION

| CUT SCREEN ID | SHARED SCREEN ID | DISPLAY REGION INFORMATION | RELATED CUT SCREEN ID | ACTUAL DATA |
|---|---|---|---|---|
| S001 | C0001 | | S002,S003 | ... MANAGEMENT OF COMPANY A |
| S002 | C0001 | | S003,S001 | ... MANAGEMENT ENVIRONMENT |
| S003 | C0001 | | S001,S002 | ... PRODUCT STRATEGY |
| S004 | C0002 | | | |
| . . . | . . . | . . . | . . . | . . . |

Fig. 5

NOTE EDIT SCREEN INFORMATION

| NOTE EDIT SCREEN ID | NOTE ACTUAL DATA STORAGE INFORMATION | CUT SCREEN ID | DISPLAY REGION INFORMATION |
|---|---|---|---|
| M0001 | http://a.・・・ | S001 | |
| M0002 | http://a.・・・ | S001, S002, S003 | |
| ⋮ | ⋮ | ⋮ | |

ELECTRONIC CONFERENCE SUPPORT DEVICE, ELECTRONIC CONFERENCE SUPPORT METHOD, AND INFORMATION TERMINAL DEVICE OF ELECTRONIC CONFERENCE SYSTEM

PRIORITY INFORMATION

This application claims priority from Japanese Patent Application No. 2006-108266, filed on Apr. 11, 2006, which is incorporated herein by reference in its entirety.

BACKGROUND

1. Technical Field

The present invention relates to an electronic conference system having a presenter terminal device which is used by a presenter and on which a screen image shared within the system is displayed and a conference participant terminal device which is used individually by a participant and in which a screen image displayed on the presenter terminal device is acquired and displayed, and, in particular, to association of a shared screen image and a screen image individually generated by a conference participant at the side of the conference participant terminal device.

2. Related Art

Recently, many companies have introduced electronic conference systems in order to improve efficiency in conducting conferences. An electronic conference system of the related art has a touch panel display device, such as an electronic whiteboard, placed at a position which can be seen by all conference participants in the conference room, and an information terminal device for individual use by each participant in the conference room (hereinafter referred to as "participant terminal"). A presenter in the conference proceeds with the conference by showing materials of the conference on the touch panel display device. Because the content displayed on the touch panel display device is also displayed on the participant terminal in real time, the conference participant can carry out a discussion while referring to the conference materials displayed on the touch panel display device or on the participant terminal used by the conference participant. In addition, a note-editing function is provided in the participant terminal so that, when a conference participant writes a note on the screen image which is being displayed, the note is incorporated into the displayed screen image, and the synthesized image is stored as a note edit screen image. Because the conference participant can retain a note in association with the conference materials displayed on the screen by means of the note-editing function, after the conference is completed the conference participant can easily know which discussion using which conference material is associated with the note, by referring to the written note.

SUMMARY

According to one aspect of the present invention, there is provided an electronic conference device having a cut screen information management section that stores information related to a cut screen object which forms a portion of a screen image displayed on a presenter-side display unit; a screen image generation processor that generates a screen image based on stored information related to a cut screen object designated from among cut screen objects contained in a screen image displayed on a participant-side display unit, by incorporating the designated cut screen object into image data to be newly displayed on the participant-side display unit; and an edit screen information storage unit that stores, in association with each other, information related to the generated screen image and information related to the cut screen object incorporated into the screen image.

BRIEF DESCRIPTION OF THE DRAWINGS

These and other aspects of the disclosure will become apparent from the following description when read in conjunction with the accompanying drawings, wherein the same reference numerals have been applied to like parts and in which:

FIG. 5 is a diagram exemplifying a data structure of shared cut screen information set and stored in a shared cut screen information storage according to an exemplary embodiment of the present invention;

DETAILED DESCRIPTION

An exemplary embodiment of the present invention will now be described by reference to the drawings.

Figure 1:
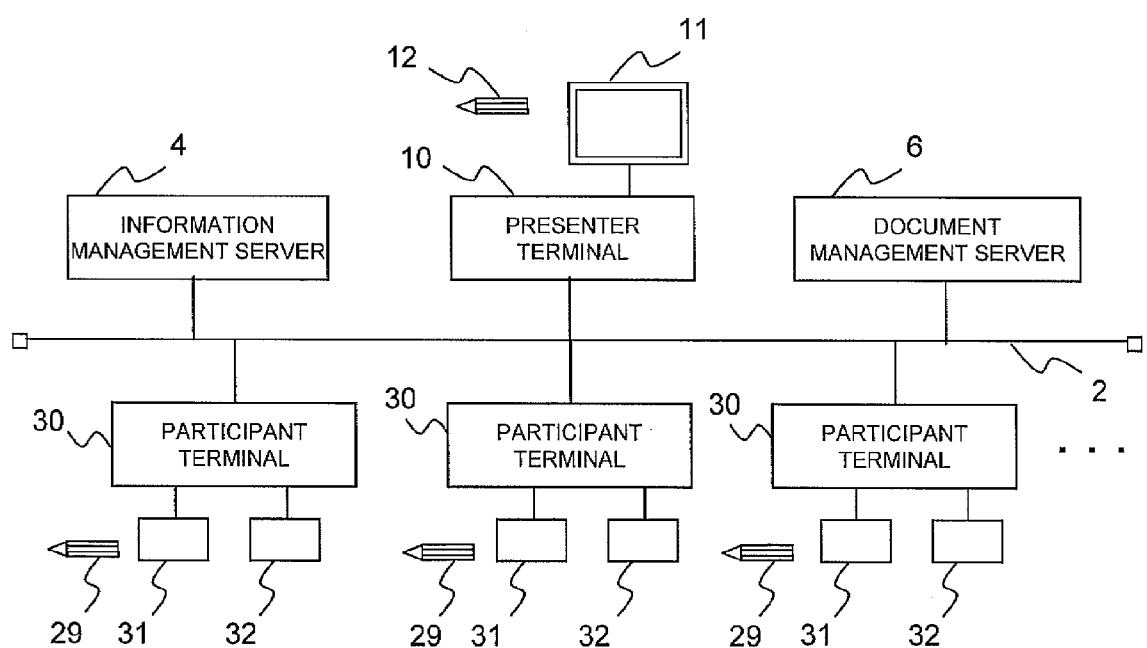
FIG. 1 is an overall structural diagram of an electronic conference system according to an exemplary embodiment of the present invention.

FIG. 1 is an overall structural diagram of an electronic conference system according to an exemplary embodiment of the present invention. FIG. 1 shows an information terminal device 10 that is used by a presenter in an electronic conference (hereinafter referred to as "presenter terminal"), multiple information terminal devices (participant terminals) 30 that are provided in the same conference room as the presenter terminal 10 and used individually by respective participants in the electronic conference, an information management server 4 that stores and manages information related to a user who participates in the electronic conference, and a document management server 6 that stores and manages electronic data or the like of a conference material which is prepared by the presenter in advance, the presenter terminal 10, the participant terminals 30, the information management server 4, and the document management server 6 being connected via a network such as a LAN 2. The presenter terminal 10 has a touch panel display device 11 provided to allow a participant to refer to the display content and taking the form of, for example, an electronic whiteboard, and an electronic pen 12 which is used for writing on a display screen of the touch panel display device 11. Each participant terminal 30 has an IC card reader 31 which reads an IC card owned by the conference participant for authentication of the user who participates in the conference, a display 32 on which display content on the touch panel display device 11 of the presenter terminal 10 is displayed in real time, and an electronic pen 29 which is used for writing on a display screen of the display 32. Each participant terminal 30 is provided with functions such as a note-editing function which allows a participant to write, for example, a note on the display content on the display 32.

Figure 2:
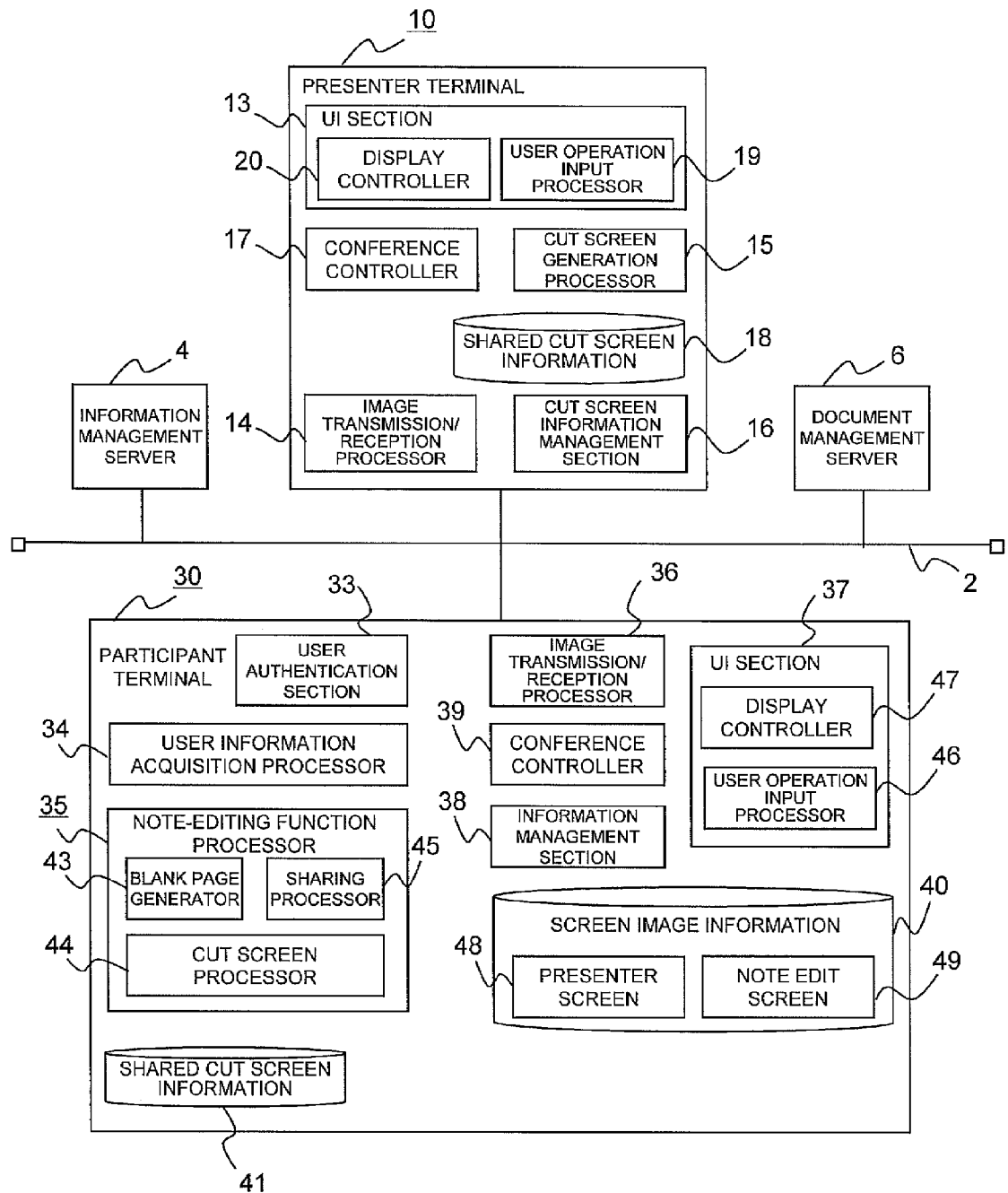
FIG. 2 is a block structural diagram of an electronic conference system according to an exemplary embodiment of the present invention.

FIG. 2 is a block structural diagram of an electronic conference system according to an exemplary embodiment of the present invention. In view that all of the participant terminals 30 are formed of equivalent hardware and software, only one participant terminal 30 is shown in FIG. 2.

The information management server 4 is a server computer that stores and manages information necessary for operation of the electronic conference system and provides corresponding information in response to a request. For example, the server manages information related to each user who participates in an electronic conference such as information necessary for user authentication and information of the conference body to which each user belongs, information related to a conference room in which the electronic conference system is installed, and information related to a conference body to which each user belongs.

The document management server 6 is a server computer which stores an electronic document owned by the user who participates in the electronic conference. The conference presenter stores a conference material or the like to be used in the conference in the document management server 6 in advance, and the presenter terminal 10 extracts image data of the corresponding conference material in accordance with an operation and an instruction by the conference presenter and displays the same on the touch panel display device 11.

The presenter terminal 10 used by the conference presenter has a user interface section 13, an image transmission/reception processor 14, a cut screen generation processor 15, a cut screen information management section 16, a conference controller 17, and a shared cut screen information storage unit 18. The user interface section 13 has a user operation input processor 19 which receives a user operation via an input device such as the electronic pen 12, and a display controller 20 which controls display on the touch panel display device 11. The image transmission/reception processor 14 performs transmission and reception processes of a screen image such as transmission of the screen image displayed on the touch panel display device 11 to the participant terminal 30 and reception of a screen image transmitted from the participant terminal 30. The cut screen generation processor 15 generates a cut screen object according to a cut screen object generation operation by a conference presenter. The shared cut screen information storage unit 18 stores information related to a cut screen which can be shared by conference participants who use the participant terminals 30, and the cut screen information management section 16 manages information related to a cut screen which is to be stored in the shared cut screen information storage unit 18 and managed, such as transmission of the cut screen object stored and managed by the shared cut screen information storage unit 18 to the participant terminal 30 and storage of the cut screen object received from the participant terminal 30. The conference controller 17 controls operations such as the startup of the constituent elements 13-16, to thereby control the overall electronic conference. The processing functions in the structures 13-16 of the presenter terminal 10 are realized through cooperation of a computer forming the presenter terminal 10 and an electronic conference support program executed on a CPU equipped in the computer. The shared cut screen information storage unit 18 is conceived to be realized by an external storage such as an HDD. The shared cut screen information storage unit 18 is not necessarily provided in the presenter terminal 10, and there may be employed a configuration in which the shared cut screen information storage unit 18 is provided in a computer which can be accessed via a network and necessary information is read and written as necessary.

The participant terminal 30 used by the conference participant has a user authentication section 33, a user information acquisition processor 34, a note-editing function processor 35, an image transmission/reception processor 36, a user interface section 37, an information management section 38, and a conference controller 39. The user authentication section 33 performs user authentication of a user participating in the electronic conference. The user information acquisition processor 34 acquires information related to the conference participant from the information management server 4. The participant terminal 30 in the exemplary embodiment has various functions, including an electronic mail transmission function. In relation to these functions, the note-editing function processor 35 controls execution of the note-editing function process. The note-editing function is a processing function that allows writing of a note on a screen image displayed on a display of the participant terminal 30. The screen image to which the note is to be written is basically a screen image transmitted from the presenter terminal 10 or a screen image of a blank page newly generated by and displayed on the participant terminal 30. The note-editing function processor 35 in the exemplary embodiment has a blank page generator 43, a cut screen processor 44, and a sharing processor 45. The blank page generator 43 generates the blank page in accordance with a user operation. The cut screen processor 44 applies processes to the cut screen which is handled during use of the note-editing function, such as display, on the display 32 in the form of a list, among the cut screens to be processed when the note-editing function is used, incorporation of the cut screen into the screen image which is being displayed on the display 32, and storage of a cut screen which is locally generated, the details of which will be described later. The sharing processor 45 performs processes necessary for sharing, such as transmitting a locally generated cut screen to the presenter terminal 10.

The image transmission/reception processor 36 receives a screen image transmitted from the presenter terminal 10. The image transmission/reception processor 36 also transmits a screen image displayed on the display 32 to the presenter terminal 10 in accordance with an instruction by a user. The user interface section 37 has a user operation input processor 46 which receives a user operation by means of an input device, and a display controller 47 which controls display on the display 32. The participant terminal 30 in the exemplary embodiment has, as storage units, storage units 40 and 41 which store the screen image information and the shared cut screen information, respectively, and the information management section 38 manages the information by, for example, reading and writing various types of information in accordance with requests from other constituent elements. The conference controller 39 controls operations of the constituent elements 33-38 such as the startup of these constituent elements, to thereby control the overall electronic conference. The processing functions in the elements 33-38 of the participant terminal 30 are realized by cooperation between a computer forming the participant terminal 30 and an electronic conference support program executed on a CPU equipped in the computer. Each of the storage units 40 and 41 is conceived to be realized by an external storage device such as an HDD. The storage units 40 and 41 are not necessarily provided in the participant terminal 30, and there may be employed a configuration in which the storage units 40 and 41 are provided in a computer which can be accessed via a network and necessary information is read and written when needed.

As can be understood from the system structure described above, in this description, the electronic conference system is not limited to a conference implemented by connecting remote sites and refers to any conference system which is implemented by using computers such as the presenter terminal 10 and the participant terminal 30.

Operation of the exemplary embodiment will now be described. First, a basic flow of a conference using an electronic conference system will be described. Then, a generation process of a cut screen at the side of the presenter terminal 10 will be described. Finally, characteristic processes of the exemplary embodiment such as storage of a screen image associated with the cut screen will be described.

First, regarding the basic flow of the conference, the process until a discussion is started in an electronic conference will be described. Each participant in the conference sits down at a predetermined position in the conference room in which the participant terminal 30 is provided and allows the ID card reader 31 to read an IC card owned by the participant. The user authentication section 33 transmits a user ID of the participant read by the IC card reader 31 to the information management server 4 and inquires an attribute of the IC card owner. When the user is authenticated as a result of the authentication process by the information management server 4, the user information acquisition processor 34 acquires, from the information management server 4, information necessary for participating in the electronic conference, such as information of a repository used by the conference participant. In this manner, the user participates in a conference.

When the conference is started, the conference presenter proceeds with the conference by means of operating the presenter terminal 10. Screen images are transferred between the image transmission/reception processors 14 and 36 through cooperative operation of the conference controllers 17 and 39, and the screen image displayed on the touch panel display device 11 of the presenter terminal 10 is displayed on the display 32 of each participant terminal 30. In addition, when the screen image displayed on the touch panel display device 11 is changed, the display content on the display 32 of each participant terminal 30 is changed in real time with the changed screen image. The basic operation of the screen display may be similar to that in the related art.

The conference participant participates in the conference by referring to the display content of the touch panel display device 11 or the display 32. When the conference participant wishes to write a note on the displayed screen image, the conference participant writes on the screen image on the display 32 by means of the note-editing function of the participant terminal 30. The operation of the user interface section 37 and the user operation in the exemplary embodiment will now be described by reference to FIG. 3.

On the display 32 of the participant terminal 30, there are provided display regions of a main screen 51 and a sub-screen 52, a display region 53 of a stored screen image, and various buttons which are GUI components for executing various functional processes. The display of the display regions and buttons is realized by the display controller 47. A screen image transmitted from the presenter terminal 10 as described above is displayed on the main screen 51. The main screen 51 also functions as a note-editing operation region. When a screen image transmitted from the presenter terminal 10 is to be displayed, the display content is updated in real time, and, thus, the display content on the main screen 51 is dynamically updated. In contrast, during execution of the note-editing function, the screen image which is being displayed is fixed so that the screen is not successively updated. On the sub-screen 52, a screen image transmitted from the presenter terminal 10 when the main screen 51 is in a still-image state for note writing is displayed. On the stored screen image display region 53, screen images stored in the screen image information storage 40 are displayed in time sequence and in thumbnails. In the exemplary embodiment, the presenter screen and the note-editing screen are stored in different storage regions 48 and 49. The screen images stored in the storage region 48 or in the storage region 49 are displayed in a manner to allow switching, by selecting one of a presenter screen tab 54 and a note list selection tab 55. When a number of stored screen images is increased, a desired screen image can be displayed by means of operating a scroll button 56 as necessary.

As buttons for providing service functions, in the exemplary embodiment, various buttons 57-62 are provided, including a "transmit to presenter" button, a "clarify cut screen" button, a "delete note" button, a "store note" button, a "switch mode" button, and an "add blank page" button. The service functions executed when the various buttons 57-62 are selected will be described later. The conference participant writes on the screen image of the conference material or the like displayed on the main screen 51 through a predetermined input operation, on the main screen 51, using the electronic pen 29 or the like and stores the note-editing screen image by pressing on the store note button 60 or the like. When there is insufficient space for writing the note because there is insufficient blank space on the conference material being displayed, the add blank page button 60 is pressed to display a blank screen image on the main screen 51. Then, the store note button 62 is pressed or the like so that the note-editing screen image is stored. When there is no need for note writing, the delete note button 59 is pressed to discard the note.

The basic flow of the conference using the electronic conference system has been described. Next, a process of generating a cut screen will be described.

Figure 4:
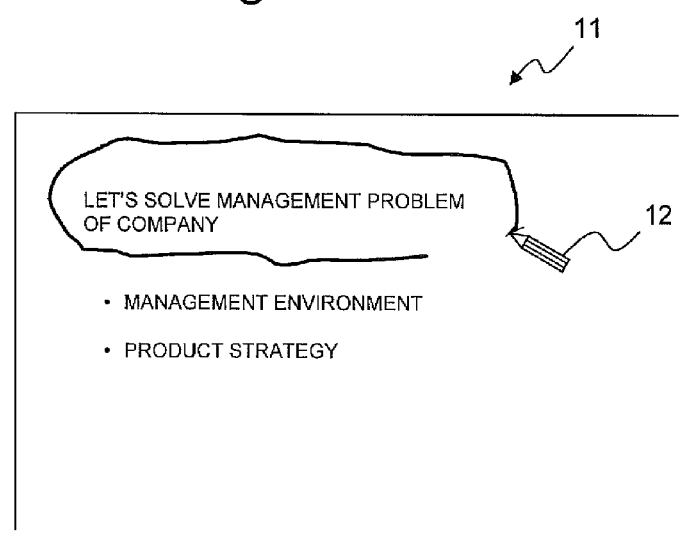
FIG. 4 is a diagram for explaining a user operation of generating a cut screen object in an exemplary embodiment of the present invention.

FIG. 4 is a diagram for explaining a user operation for generating a cut screen object in the exemplary embodiment.

In the exemplary embodiment, in general, the conference presenter who uses the presenter terminal 10 generates a cut screen object.

First, the conference presenter selects a generation mode of the cut screen object. The conference presenter can select a desired mode by, for example, operating a mode switching switch provided on the electronic pen 12, using an electronic pen for the generation mode from among prepared electronic pens corresponding to the modes, etc. When the conference controller 39 determines that a generation mode of a cut screen object is selected by detecting the user operation, the conference controller 39 starts the cut screen generation processor 15. When the conference presenter draws a closed curve on the screen using the electronic pen 12 to form a closed space, the cut screen generation processor 15 extracts a screen image contained in the closed space and obtains bitmap data. As described, the screen image contained in the closed space designated by the user on the screen image which is being displayed corresponds to the cut screen object. The cut screen generation processor 15 also generates display region information which is information for identifying a display position of the closed space on the screen image. Because the closed space is formed by connecting line segments, the display region information can be represented with coordinate data of the ends of the line segments and the shape. Alternatively, it is also possible to determine a rectangular shape surrounding the closed space and set the coordinate data of the corners of the rectangular shape as the display region information. The cut screen generation processor 15 newly assigns a cut screen ID to a generated cut screen object and acquires a screen ID of a screen image in which the cut screen object is generated. The cut screen generation processor 15 stores the cut screen ID, screen ID, display region information, and bitmap data acquired in this manner, in association with each other in the shared cut screen information storage unit 18.

FIG. 5 is a diagram showing an example data structure of shared cut screen information which is set and stored in the shared cut screen information storage unit 18 in the exemplary embodiment. In the shared cut screen information storage unit 18, a new record is generated and stored every time a cut screen is generated. A cut screen ID is information uniquely assigned to each cut screen, and the cut screen ID, shared screen ID, display region information, and actual data correspond respectively to the cut screen ID, screen ID, display region information, and bitmap data as described above. In this structure, multiple cut screen objects can be generated from a screen image. In this case, in the related cut screen ID, there are set cut screen IDs of other cut screens generated from the screen image from which the cut screen is generated. In the stored example of FIG. 5, it can be seen that cut screens of cut screen IDs "S001", "S002", and "S003" are generated from the screen image of the screen ID of "C0001".

In this manner, a cut screen is generated in accordance with an operation of the presenter and information related to the cut screen is set and stored in the shared cut screen information storage unit 18. The information stored in the shared cut screen information storage unit 18 is also set and stored in the shared cut screen information storage unit 41 of each participant terminal 30. This is done in the following manner.

As described, the screen image displayed on the touch panel display device 11 of the presenter terminal 10 is displayed also on the display 32 of each participant terminal 30 in real time. More specifically, the display process on the display 32 is performed in the following manner. Each participant terminal 30 which is logged in by a conference participant periodically inquires the presenter terminal 10 for existence of display of a new screen image; for example, once every second. When a new screen image is displayed on the touch panel display device 11, the presenter terminal 10 transmits the new screen image to the inquiring participant terminal 30. Because the update timing of this process is a short time such as one second, updating of the screen display on the presenter terminal 10 can be reflected in the display 32 in real time. The same also applies to the information related to the cut screen. That is, each participant terminal 30 which is logged in by the conference participant periodically inquires the presenter terminal 10 of generation of a new cut screen; for example, once every second, and stores information transmitted in response to the inquiry to the shared cut screen information storage unit 41. Therefore, the contents of the shared cut screen information storage unit 18 of the presenter terminal 10 and the shared cut screen information storage unit 41 of the participant terminal 30 are set to be substantially identical with each other.

Next, an association process of a cut screen and content of note which is a characteristic of the exemplary embodiment will be described. First, a basic function provided by the exemplary embodiment will be described by reference to a transition diagram of display screen on the display 32 shown in FIG. 6 and a flowchart shown in FIG. 7.

Figure 6A:
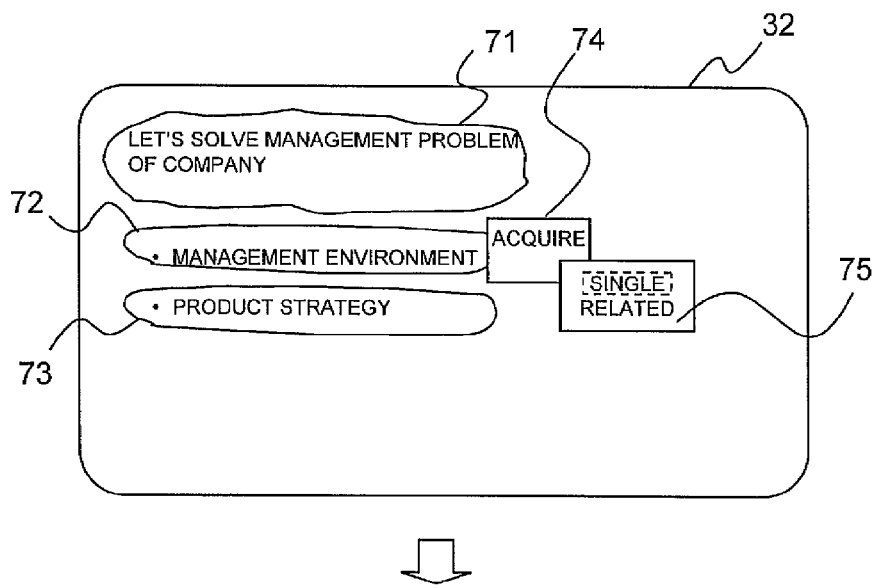
FIGS. 6A-6C are diagrams showing a transition of a screen image displayed on the display of the participant terminal in an exemplary embodiment of the present invention.
Figure 6B:
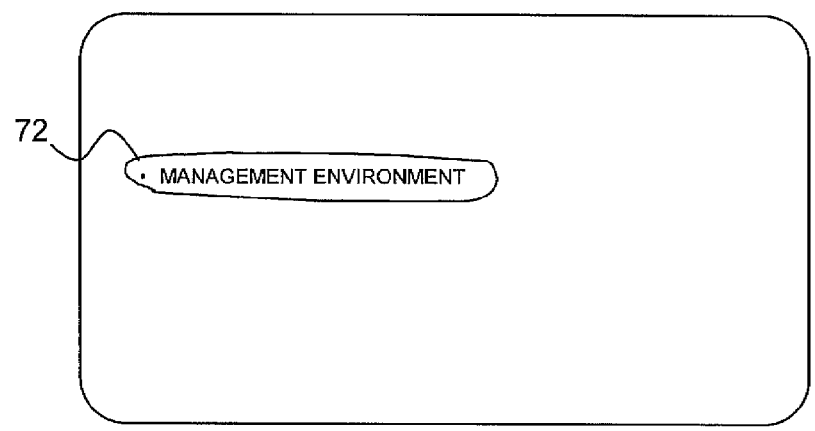
Figure 6C:
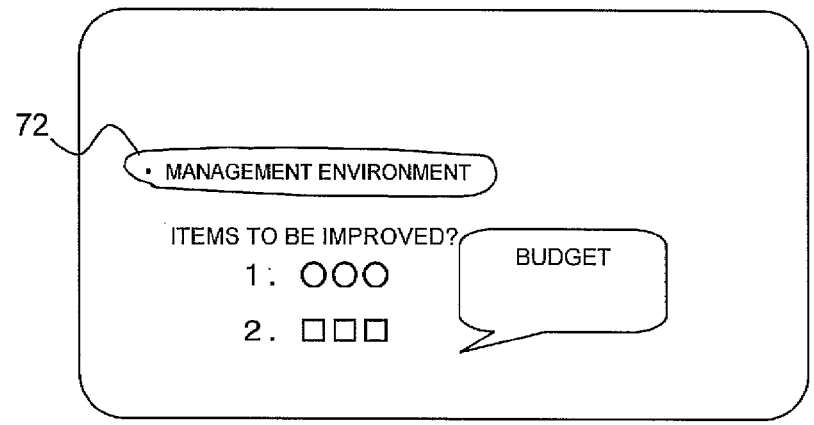

FIG. 6A shows an example display when a screen image transmitted from the presenter terminal 10 is displayed, the screen image including three cut screens 71, 72, and 73. When the conference participant wishes to attach a note with regard to the content of "Management Environment", the conference participant selects a cut screen designation mode through a predetermined mode switching operation and selects the cut screen 72 containing "Management Environment" by means of an input device such as the electronic pen 29 or a mouse. When a user operation with respect to the screen surface of the display 32 is detected, the conference controller 39 fixes the display of the screen image which is being displayed and starts the note-editing function processor 35. When the input operation with respect to the display 32 is recognized as a designation operation of the cut screen 72, the note-editing function processor 35 identifies the selected cut screen by comparing and matching display region information of the cut screen stored in the shared cut screen information storage unit 41 and the point position information (step 110). In the exemplified configuration, because the cut screen 72 is designated, the note-editing function processor 35 refers to the display region information of the cut screen 72 and displays a pull-down menu 74 at a position corresponding to the cut screen 72. When "acquire" is selected from the pull-down menu 74, a sub-menu 75 provided corresponding to "acquire" is further displayed (step 120). In FIG. 6A, "single" is selected from the sub-menu 75. When an instruction by the conference participant is received (step 130) and the instruction is "single", the note-editing function processor 35 activates the blank page generator 43 to automatically generate a blank page on the display 32 and newly displays the blank page on the screen. Simultaneously with the generation of the blank page, the cut screen processor 44 obtains information related to the cut screen 72 designated by the conference participant from the shared cut screen information storage unit 41 and pastes the cut screen 72 at a position of the blank page which can be identified by the display region information (step 140). A state in which the object of the cut screen 72 is displayed on the blank page is shown in FIG. 6B. The conference participant then writes a note by means of the note-editing function on the screen on which the cut screen 72 is displayed (FIG. 6C). Upon receipt of an instruction to complete the note-editing function such as pressing of the store note button 60 (step 150), the note-editing function processor 35 instructs the information management section 38 to store information related to the screen image displayed on the display 32 at the time of input of the completion instruction, into the note edit screen storage region 49 of the screen image information storage 40 (step 160).

Figures 7, 8:
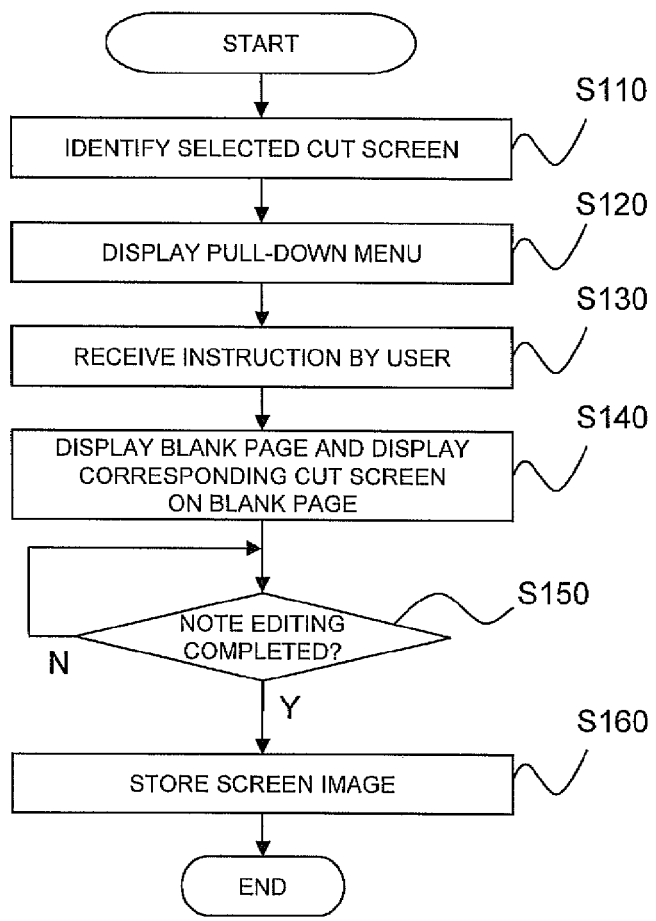
FIG. 7 is a flowchart showing an association process of a cut screen and content of a note according to an exemplary embodiment of the present invention.
FIG. 8 is a diagram exemplifying a data structure of information related to a note edit screen according to an exemplary embodiment of the present invention.

FIG. 8 is a diagram showing an example data structure of information related to a note edit screen in the exemplary embodiment. The information related to the note edit screen is newly generated when a note is written, by means of the note-editing function, to a screen image transmitted from the presenter terminal 10 or when a note is written to a screen image of a blank page which is newly prepared as in the exemplified configuration. The newly generated information related to the note edit screen is stored in the screen image information storage unit 40. As shown in FIG. 8, the information related to the note edit screen includes a note edit screen ID, note actual data storage information, a cut screen ID, and display region information. In the note edit screen ID, identifier information which is uniquely assigned for identifying the newly generated note edit screen is set. In the note actual data storage information, information for identifying the storage destination of the note edit screen is set. In the cut screen ID, a cut screen ID of the cut screen incorporated into the note edit screen is set. Because the information related to the cut screen can be acquired by searching the shared cut screen information storage unit 41 while using the cut screen ID as a key, in the exemplary embodiment, only the cut screen ID is included in the information with respect to the cut screen. Meanwhile, in the exemplary embodiment, in order to enable movement of the cut screen object on the note edit screen image, the display region information is stored for each cut screen corresponding to the cut screen. With this configuration, it is possible to display the cut screen incorporated into the note edit screen at a position different from the shared screen image.

In the exemplary embodiment, there is employed a data structure in which information for identifying a cut screen handled at the participant terminal 30; that is, the cut screen ID, is added to information related to the note-editing screen to be stored in the screen image information storage unit 40, and information related to the cut screen is obtained each time by obtaining necessary information based on the cut screen ID. The present invention, however, is not limited to such a configuration and there may also be employed a configuration in which the information related to the locally handled cut screen is individually stored and managed in the participant terminal 30. In addition, although the exemplary embodiment is configured such that information related to the note edit screen is stored in the screen image information storage unit 40, the present invention is not limited to such a configuration and there may also be employed a configuration in which a storage device is provided separately from the screen image information storage unit 40 and stores the information related to the note edit screen.

As described, when sufficient space for writing a note regarding a content being discussed (in the above-described example, "Management Environment") is not available on the screen image which is being displayed, a blank page is automatically generated and displayed on the screen, and a cut screen 72 including the display portion of the discussion content is automatically extracted and pasted on the newly displayed blank page. By virtue of this structure, it is possible to associate the writing of the note on the blank page and the discussion content. The conference participant can secure sufficient writing space for the note through a simple operation of selecting a desired cut screen 72 from a screen image and selecting a desired function from a menu displayed by the selection operation, and, at the same time, can easily understand the association relationship between the discussion content and the written note, because the discussion content is automatically pasted on the blank page.

A basic function for associating the cut screen and the written note has been described. Next, application of other functions provided in the exemplary embodiment will be described.

FIG. 9 is a diagram showing a transition of display screen on the display 32. In the description of FIG. 6, "single" is selected from the sub-menu 75. Here, there is described a case where "related" is selected.

Figure 9A:
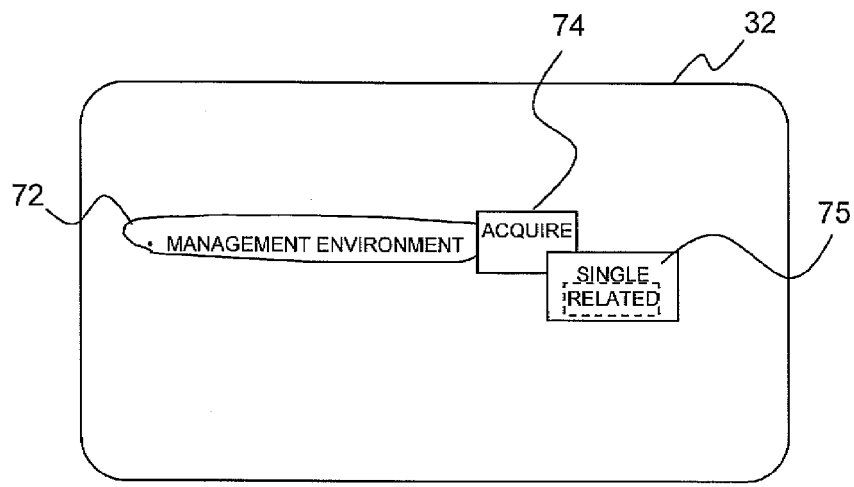
FIGS. 9A-9C are diagrams showing a transition of a screen image displayed on the display of the participant terminal in an exemplary embodiment of the present invention.
Figure 9B:
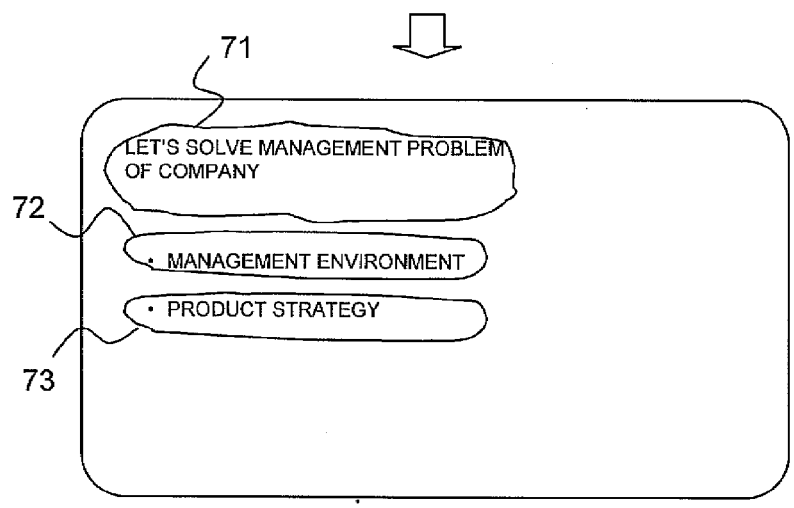

FIG. 9A shows a screen image of a state in which only a cut screen 72 is pasted on the blank page due to, for example, selection of "single" from the shared screen image. When the conference participant desires to also incorporate a cut screen related to "Management Environment"; in the example configuration, a cut screen contained in the same shared screen image as "Management Environment", the conference participant selects the cut screen 72 to display the pull-down menu 74, and selects "related" from the displayed sub-menu 75. When a selection instruction by the conference participant is received and the instruction is "related", the note-editing function processor 35 refers to the shared cut screen information storage 41 while using the cut screen ID of the cut screen 72 as a key to acquire a related cut screen ID corresponding to the cut screen 72. In this manner, the cut screens 71 and 73 related to the cut screen 72 can be identified, and the objects of the cut screens 71 and 73 are incorporated into the screen image which is being displayed, by reference to the information related to the cut screens; more specifically, the display region information and the actual data, and the resulting screen image can be displayed on the screen. As a result of this process, as shown in FIG. 9B, the cut screens 71 and 73 related to the cut screen 72 can additionally be pasted in the screen image which is being displayed.

Figure 9C:
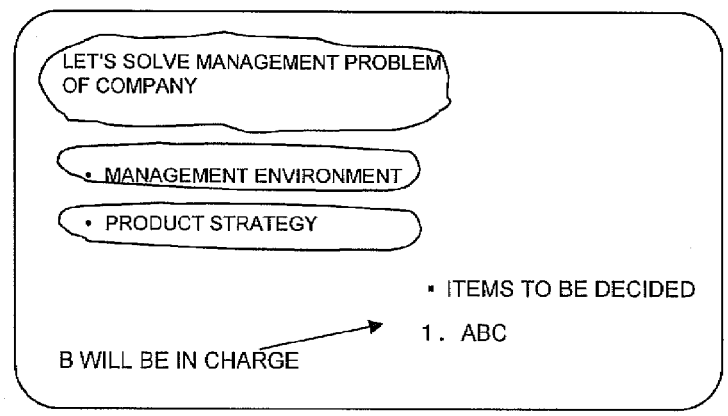

Here, there is explained a configuration in which the cut screens 71 and 73 related to the screen image in a state in which the cut screen 72 is already pasted are additionally pasted, but the present invention is not limited to such a configuration. For example, it is also possible to select one of the cut screens 71-73 in the screen image shown in FIG. 6A and select "related" from the sub-menu 75, to thereby simultaneously paste multiple cut screens 71-73 on a newly-generated blank page. As a result, a screen image identical with that shown in FIG. 9B can be obtained. Then, as shown in FIG. 9C, the conference participant writes a note on the screen image and stores the note. This process is identical with the process in the case in which "single" is selected, and, thus, repeated description is omitted.

Because multiple cut screens are contained in the note edit screen, multiple cut screen IDs are stored in association with the cut screens as shown in the example of the stored data having a note edit screen ID of "M0002" shown in FIG. 8.

In the above, a process related to a cut screen contained in a screen image transmitted from the presenter terminal 10 has been described. Next, a process with respect to an acquired screen image will be described. There may be situations in which, for example, a conference participant desires to write a note about an idea conceived in relation to discussion that has already been completed. The function to be described is desirable in these situations.

Figure 10:
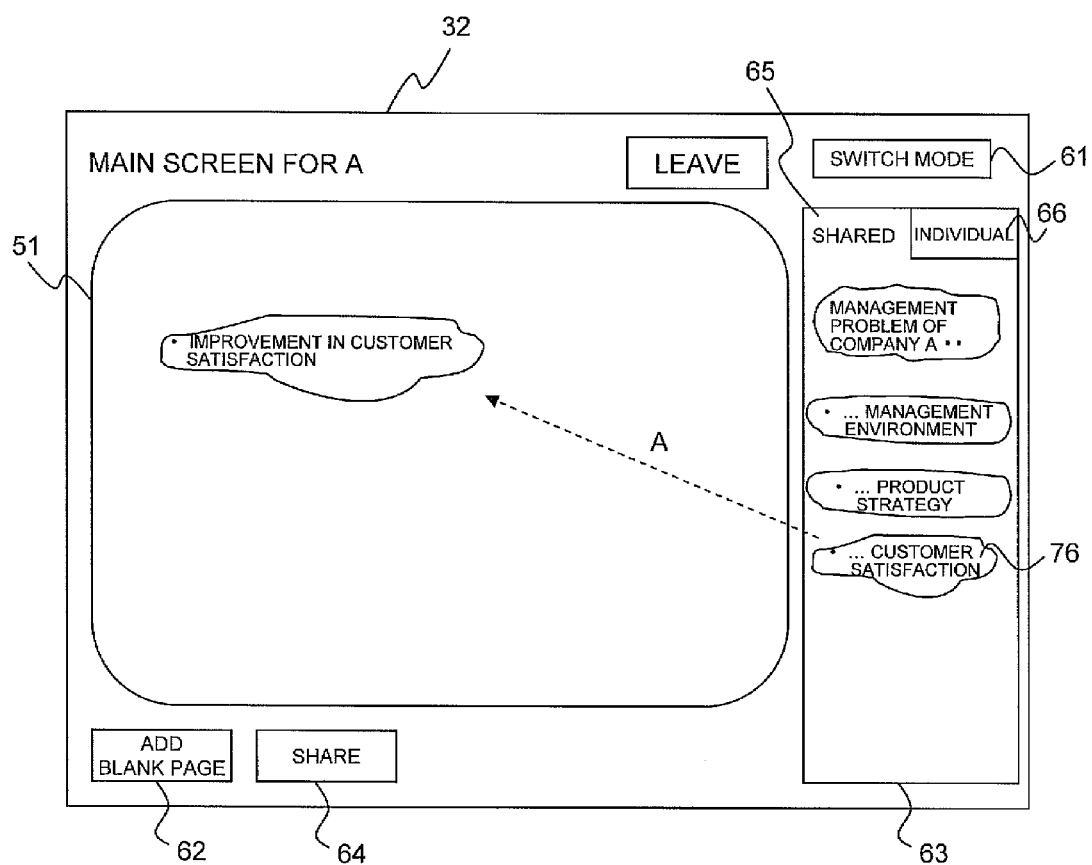
FIG. 10 is a diagram exemplifying another screen layout displayed on the display in an exemplary embodiment of the present invention.

FIG. 10 is a diagram showing another example screen layout displayed on the display 32 in the exemplary embodiment of the present invention. FIG. 10 shows a main screen 51 on which the screen image is displayed, a cut screen display region 63 on which a cut screen object is displayed, and various buttons 61, 62, and 64. On the cut screen display region 63, a shared cut screen and a cut screen which is handled locally can be displayed in a distinguishable manner, and a shared tab 65 and an individual tab 66 are provided in correspondence to the shared cut screen and the local cut screen so that the display can be switched between the two.

Figure 3:
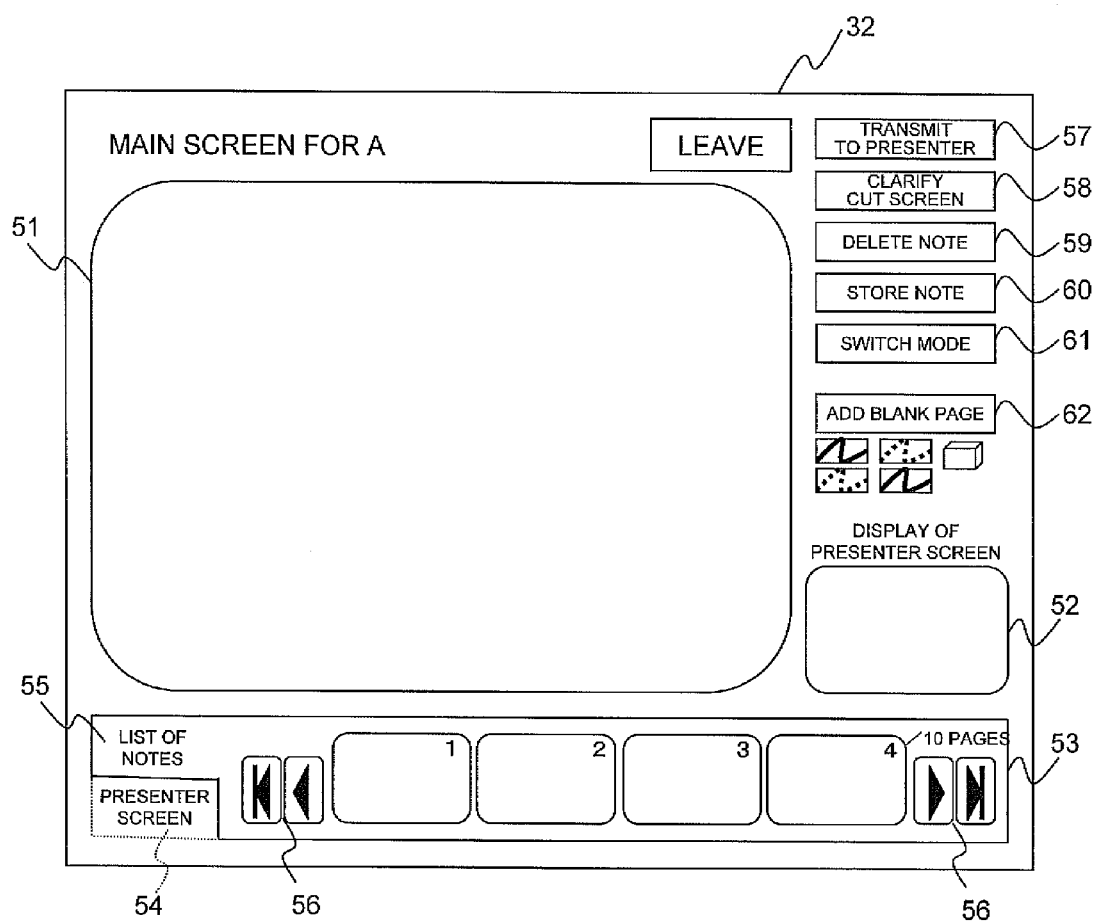
FIG. 3 is a diagram exemplifying a screen layout displayed on a display of a participant terminal according to an exemplary embodiment of the present invention.

Normally, a screen shown in FIG. 3 is displayed on the display 32. When a conference participant desires to write a note regarding a discussion already having been completed, the conference participant selects a mode switch button 61 in FIG. 3. When the conference controller 39 recognizes that a mode switching of the screen layout is instructed by analyzing a user operation received by the user operation input processor 46, the conference controller 39 instructs the display controller 47 to switch the display on the display 32 to the screen layout shown in FIG. 10 and starts the note-editing function processor 35. On the basis of an initial setting during the screen switching, the note-editing function processor 35 automatically generates a blank page and displays the blank page on the main screen 51, and, at the same time, extracts a cut screen stored in the shared cut screen information storage unit 18 and displays the cut screen images on the cut screen display region 63 in the form of a list. The conference participant selects, from among displayed cut screens, a cut screen 76 having the content with which the note to be written is to be associated and pastes the cut screen 76 on the main screen 51. In the exemplary embodiment, the pasting process to the main screen 51 can be performed by a drag-and-drop operation using a mouse as shown by a dotted arrow A. FIG. 10 shows a display state after the pasting process. The writing process to the main screen 51 and storage of the note edit screen image on which a note is written are identical with the processes described above, and their repeated descriptions are omitted.

As described, according to the exemplary embodiment, a shared cut screen contained in a screen image which has been displayed in the past and stored in a presenter screen storage region 48 of the screen image information storage 40 can be extracted and associated with a written note. With this process, it is possible to easily associate an idea conceived after a discussion is completed with a cut screen containing the content related to the discussion.

In this example, when the mode is switched, a cut screen contained in a presenter screen; more specifically, a shared screen image which is displayed on the touch panel display device 11 of the presenter terminal 10 and downloaded, is extracted from the shared cut screen information storage unit 41, displayed on the cut screen display region 63 in a list, and a cut screen with which a written note is to be associated can be selected. In this process, however, only a cut screen; that is, a portion of the screen image, is displayed on the cut screen display region 63. In consideration of a situation in which a conference participant desires to select a cut screen while viewing the overall screen image, there may also be employed a configuration, for example, in which a presenter screen image can be selected from stored screen image display region 53 of the screen of FIG. 3 and a cut screen contained in the screen image can be selected. Because the stored screen image is displayed in the stored screen image display region 53 in thumbnail, it may be impossible to clearly confirm whether or not a cut screen is contained in the screen image by viewing the screen image displayed in the stored screen image display region 53. In consideration of this, in the exemplary embodiment, a clarify cut screen button 58 is provided as shown in FIG. 3. More specifically, when a conference participant selects the clarify cut screen button 58, the display controller 47 changes the display form of the cut screen portion contained in the thumbnail; for example, in a different color, at a different brightness, or with blinking, so that a user can easily check the presence and content of the cut screen before the mode switching.

Figure 11:
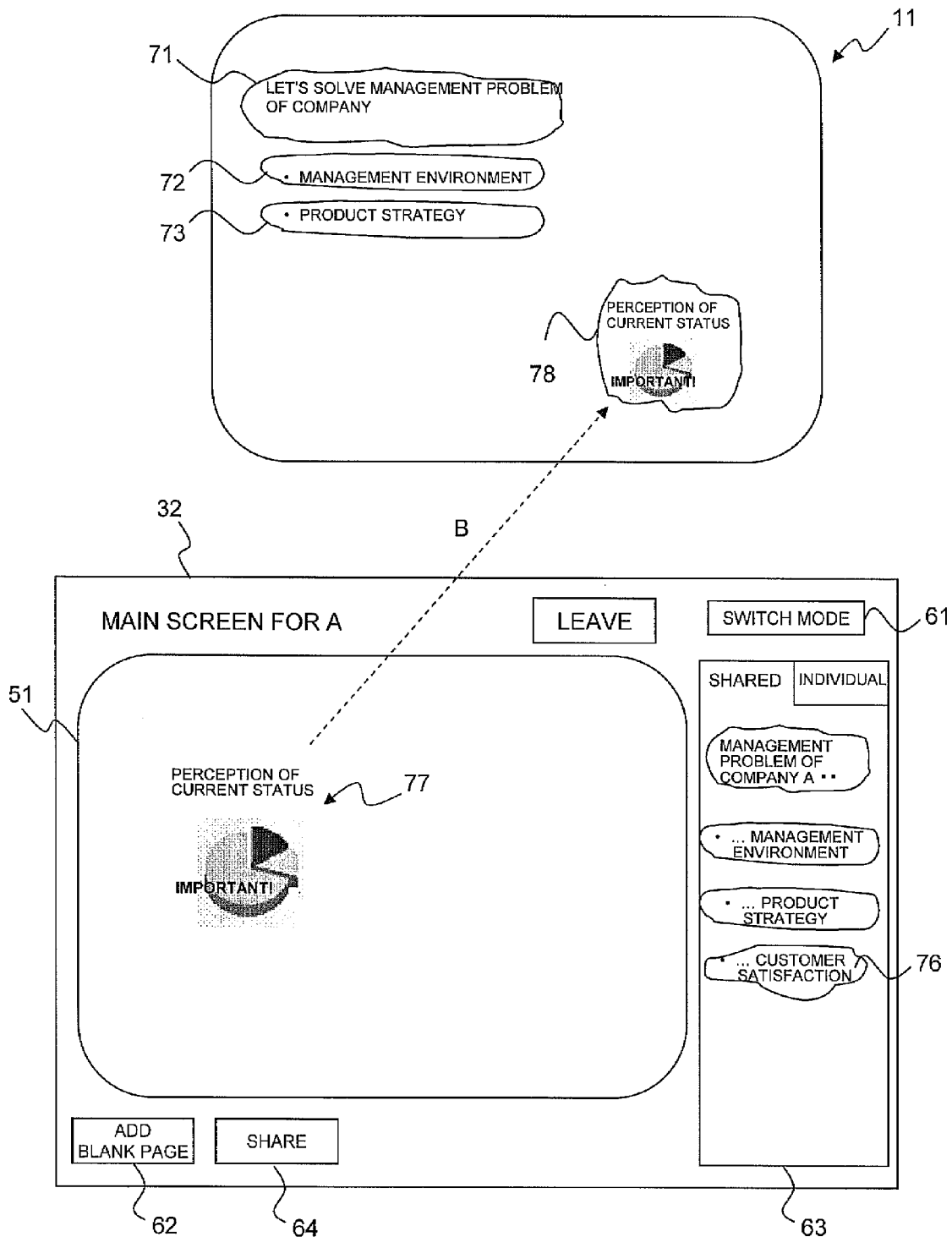
FIG. 11 is a diagram showing example screen displayed on a touch panel display device and a display in order to explain other functions in an exemplary embodiment of the present invention.

FIG. 11 is a diagram showing example screen displays on the touch panel display device 11 and the display 32 for explaining another function in the exemplary embodiment. In the above description, there is described a case where the cut screen is transmitted from the presenter terminal 10 to the participant terminal 30. The function described herein is a function to upload a screen image generated at the participant terminal 30 to the presenter terminal 10 and allow the screen image to be handled as a new shared cut screen.

More specifically, a conference participant writes a note at the participant terminal 30. In this example configuration, the note is not handwritten, but a graph 77 stored inside is read and pasted on a blank page. Then, the conference participant selects a share button 64. When the conference controller 39 receives the sharing instruction by means of this user operation, the conference controller 39 uploads to the presenter terminal 10 the screen image which is being displayed on the main screen 51. After the conference controller 17 of the presenter terminal 10 detects that a screen image is uploaded, the conference controller 17 instructs the display controller 20 to incorporate the screen image into the screen image which is currently displayed on the touch panel display device 11 and display the resulting screen image. The screen image transmitted from the participant terminal 30 is handled as a cut screen 78 contained in the screen image which is currently displayed.

The cut screen 78 does not have its display position determined, and is only displayed to indicate that a sharing instruction of a screen image which is temporarily displayed has been received from the participant terminal 30. For example, the reception of the sharing instruction is indicated by slowly moving the display position of the cut screen 78 on the screen or blinking the cut screen 78. The presenter or the like fixes the cut screen 78 on the screen through a predetermined operation. With this process, a new cut screen 78 is added to the existing cut screens 71-73 in the shared screen which is currently displayed, and the cut screen 78 based on a locally existing screen image is shared.

According to the exemplary embodiment, it is possible to share a screen image which is at the local side; that is, on the participant terminal 30.

In the exemplary embodiment, a screen image displayed on the main screen 51 is uploaded from the participant terminal 30 to the presenter terminal 10, the screen image is generated as a cut screen at the presenter terminal 10, the display position of the cut screen is determined, and a cut screen object is enlarged or reduced as necessary to determine the display size. The screen image is generated as a cut screen at the presenter terminal 10; because the screen image to which the cut screen 78 is to be incorporated is a shared screen image, the presenter terminal 10 is the unit which controls and manages the shared screen image such as the display of the shared screen image, in view that the presenter terminal 10 is the only terminal having the generation processing function of the cut screen, etc. Therefore, depending on the expansion and operation of the constituent elements, it is also possible to generate the cut screen on the side of the participant terminal 30, determine the display size and the display position at the side of the participant terminal 30, and upload the cut screen.

Figure 12:
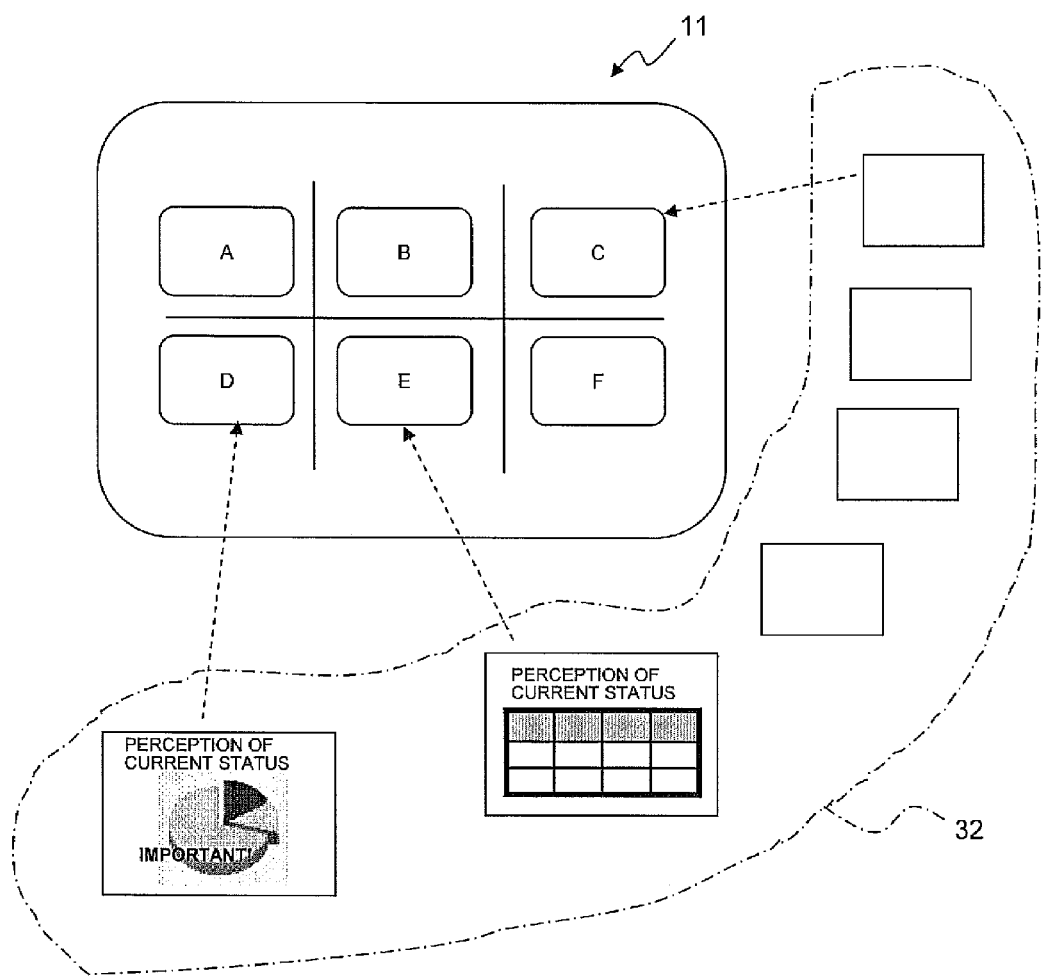
FIG. 12 is a conceptual diagram of screen displays on a touch panel display device and a display in an exemplary embodiment of the present invention.

The explanation referring to FIG. 11 is a process where a screen image is uploaded from one participant terminal 30. The present invention, however, is not limited to such a configuration, and can also be applied to a case in which screen images are uploaded from multiple participant terminals 30. FIG. 12 shows an example screen layout displayed on the touch panel display device 11 and a concept of the screen display in this process.

For example, when the presenter desires to gather from the participant terminals 30 information, opinions, etc. with respect to a certain discussion subject, generally, the screen images uploaded from the participant terminals 30 are pasted as cut screens, as shown in FIG. 11. In this process, the screen layout to be displayed on the touch panel display device 11 is switched as shown in FIG. 12 through switching of the screen display mode. With this process, the screen images uploaded from the participant terminals 30 can be displayed in the form of a list, which facilitates comparison and review of opinions or the like of the participants.

As described, there can be generated a note edit screen in which a cut screen and written note are associated, by means of the basic functions of the exemplary embodiment. Functions for referring to the note edit screen by means of the pasted cut screen will now be described.

Figure 13:
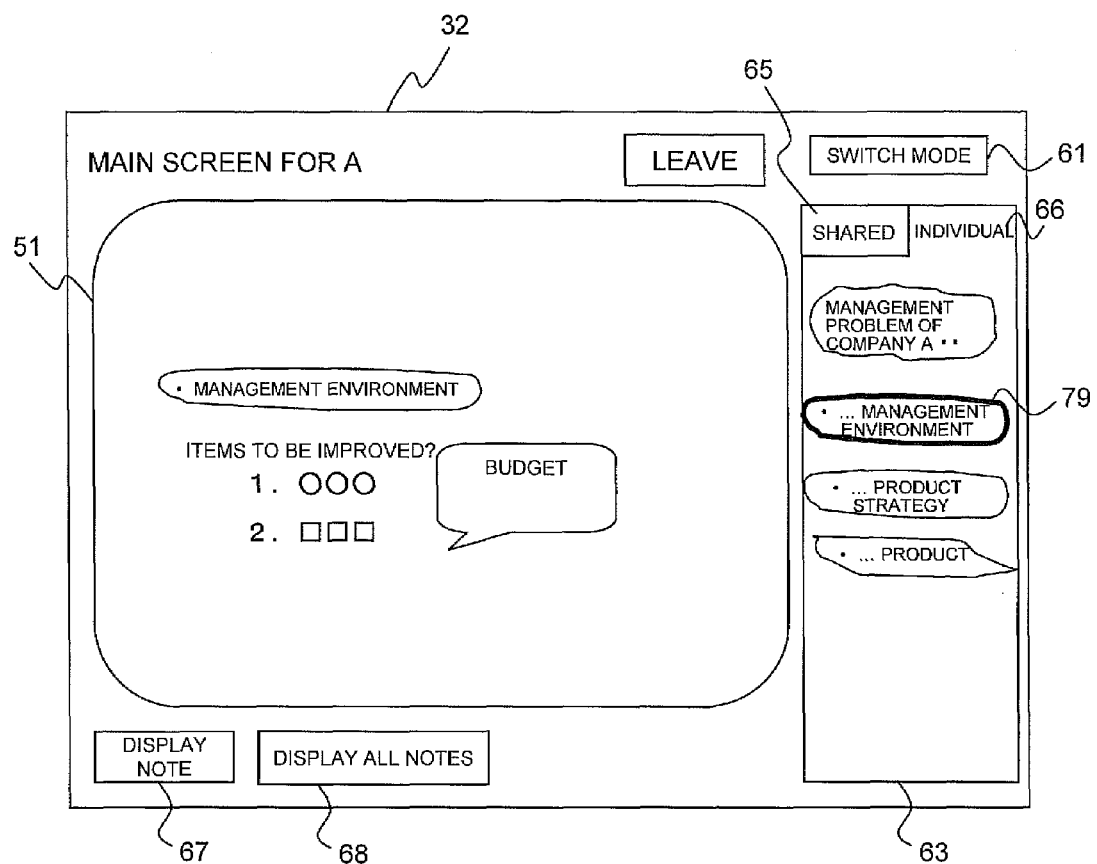
FIG. 13 is a diagram showing an example screen display on a display, for explaining other functions in an exemplary embodiment of the present invention.

FIG. 13 is a diagram showing an example screen display on the display 32 for explaining other functions of the exemplary embodiment. This screen is identical with the screen layout shown in FIG. 10, but is an example display when the individual tab 66 is selected. When the individual tab 66 is selected, cut screens which are locally used; more specifically, the objects of the cut screens contained in the information related to the note edit screen stored in the note edit screen storage region 49 of the screen image information storage 40, are displayed in the cut screen display region 63 in the form of a list.

The conference participant selects one of the cut screen objects displayed in the cut screen display region 63 and presses a display note button 67 or double-clicks a selected cut screen object 79. In response to this selection operation, the conference controller 39 identifies the note edit screen corresponding to the selected cut screen by referring to the information related to the note edit screen shown in FIG. 8, and displays the identified note edit screen on the main screen 51. FIG. 13 shows a state after the note edit screen is displayed.

In the exemplary embodiment, one cut screen can be pasted on multiple note edit screens. When the cut screen and the note edit screen have a one-to-one correspondence, the corresponding note edit screen can be displayed on the main screen 51 as described by reference to FIG. 13. When, on the other hand, multiple note edit screens correspond to one cut screen, it is not possible to determine which note edit screen is to be displayed.

Figure 14:
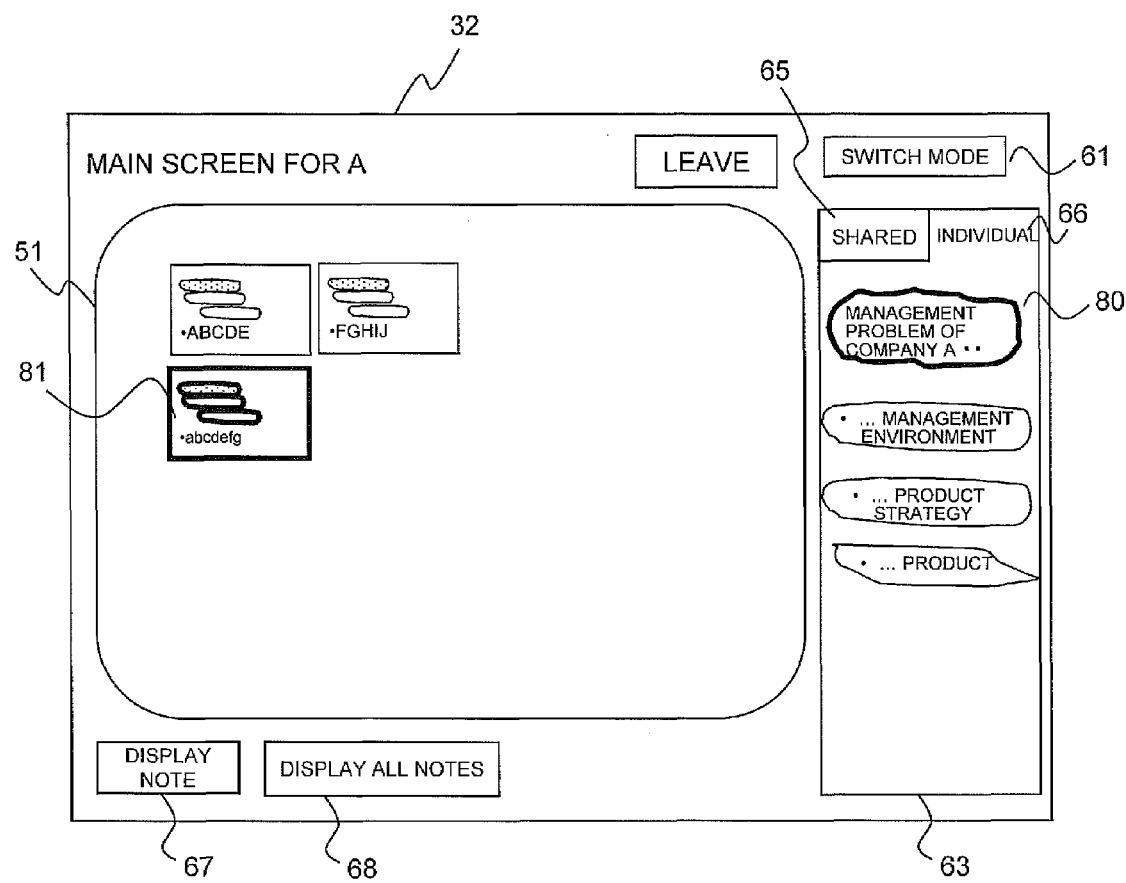
FIG. 14 is a diagram showing another example screen display on a display, for explaining other functions in an exemplary embodiment of the present invention.

In consideration of this, in the exemplary embodiment, when a cut screen 80 selected by the conference participant is pasted on multiple note edit screens, corresponding note edit screens are displayed on the main screen 51 in thumbnail as shown in FIG. 14.

Figure 15:
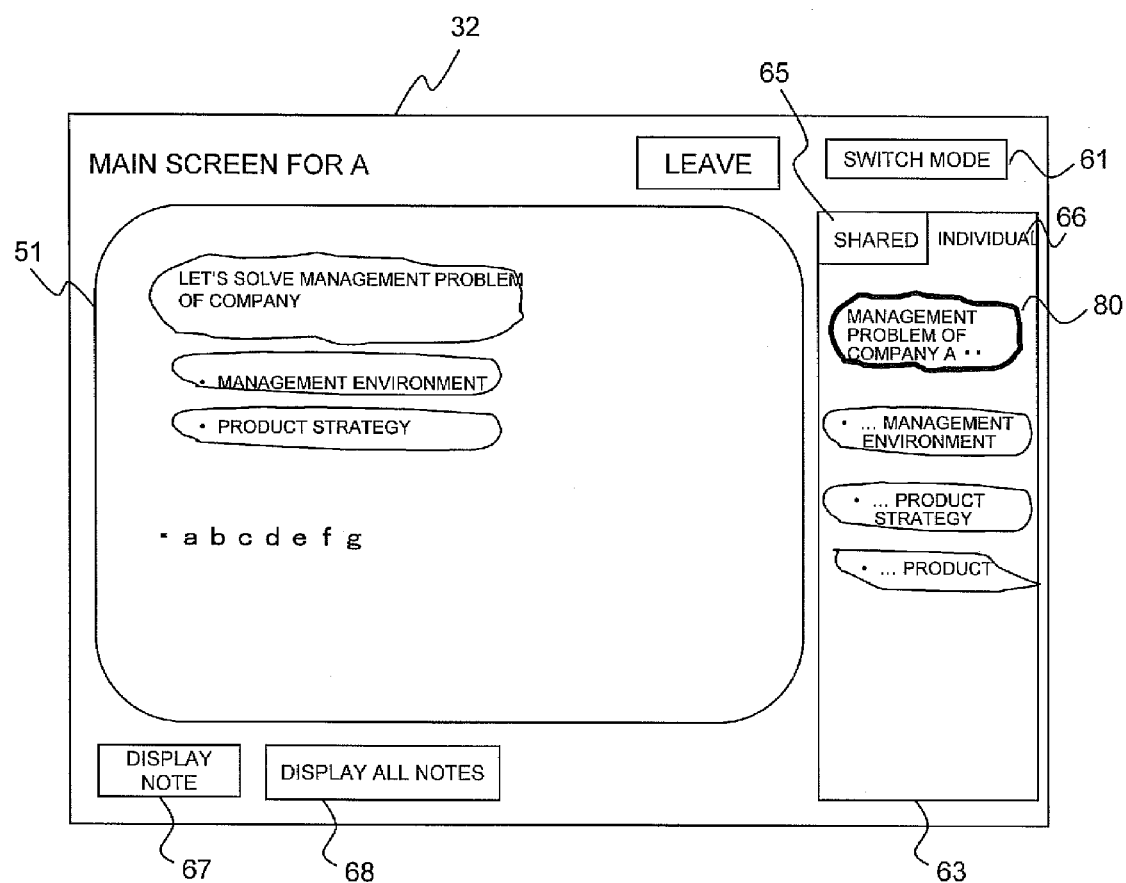
FIG. 15 is a diagram showing another example screen display on a display, for explaining other functions in an exemplary embodiment of the present invention.

When the conference participant selects a note edit screen 81 to be displayed from among the note edit screens displayed on the main screen 51 and presses the display note button 67 or double-clicks the selected note edit screen 81, the conference controller 39 displays the selected note edit screen on the main screen 51 in response to the selection operation. FIG. 15 exemplifies this process of display of the note edit screen.

If the conference participant desires to re-select the note edit screen to be displayed on the main screen 51, the conference participant presses on "display all notes" button 68. With this process, the screen returns to the screen display shown in FIG. 13 and the conference participant can again select the note edit screen to be displayed.

According to the exemplary embodiment, when there is not sufficient space on the display screen for writing a note relating to a discussion during a conference, a cut screen containing a display portion of the discussion content designated by the user can be extracted and pasted on an automatically generated screen image of a blank page. By virtue of this arrangement, the written note on the blank page can be easily associated with the discussion content.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with various modifications as are suited to the particular use contemplated. It is intended that the scope of the invention be defined by the following claims and their equivalents.

What is claimed is:

1. An electronic conference support device comprising:
   a cut screen information management section that stores information related to a cut screen object which forms a portion of a screen image displayed on a presenter-side display unit, the cut screen object being a portion of the screen image formed by being enclosed by an electronic pointing device;
   a screen image generation processor, in response to designating a cut screen object from among cut screen objects contained in a screen image displayed on a participant-side display unit, that generates a new display image on the participant-side display unit, generates a screen image based on stored information related to the designated cut screen object, and incorporates the generated screen image into the newly generated display image on the participant-side display unit; and
   an edit screen information storage unit that stores, in association with each other, information related to the newly generated display image and information related to the cut screen object incorporated into the newly generated display image.

2. The electronic conference support device according to claim 1, wherein the screen image generation processor identifies another cut screen object contained in the same screen image displayed on the participant-side display unit as the designated cut screen object and incorporates a generated screen image related to the identified cut screen object along with the generated screen image related to the designated cut screen object into the newly generated display image being displayed on the participant-side display unit.

3. The electronic conference support device according to claim 1, further comprising:
   a transmission section that transmits the generated screen image to display the generated screen image on the presenter-side display unit.

4. The electronic conference support device according to claim 1, further comprising:
   a display section that displays cut screen objects stored in the cut screen information management section;
   a reception section that receives selection at least one of the displayed cut screen objects;
   wherein the display section displays a note edit screen in which the selected cut screen object is incorporated.

5. The electronic conference support device according to claim 2, further comprising:

when there are a plurality of note edit screens, in each of which the selected cut screen object is incorporated, the plurality of note edit screens are displayed as thumbnails, and at least one of the plurality of note edit screens is selected to be displayed.

6. A computer readable recording medium storing a program causing a computer, that forms a participant terminal device included in an electronic conference system comprising a presenter terminal device that is used by a presenter and to which a presenter-side display unit is connected, a participant terminal device that is used by a participant, receives a screen image displayed on the presenter-side display unit, and displays the received screen image on a screen of a participant-side display unit which is connected to the participant terminal device, and a cut screen information management section that stores information related to a cut screen object which forms a portion of a screen image displayed on the presenter-side display unit, the cut screen object being a portion of the screen image formed by being enclosed by an electronic pointing device, to execute a process for supporting an electronic conference, the process comprising:

generating, in response to designating a cut screen object from among cut screen objects contained in a screen image displayed on a participant-side display unit, a new display image on the participant-side display unit, the designated cut screen object being a portion of the screen image formed by being enclosed by an electronic pointing device;

generating a screen image based on stored information related to the designated cut screen object;

incorporating the generated screen image into the newly generated display image on the participant-side display unit; and storing, in association with each other, information related to the newly generated display image and information related to the cut screen object incorporated into the newly generated display image.

7. The recording medium according to claim 6, wherein the process further comprises:

identifying another cut screen object contained in the same screen image displayed on the participant-side display unit as the designated cut screen object; and incorporating a generated screen image related to the identified cut screen object along with the generated screen image related to the designated cut screen object into the newly generated display image being displayed on the participant-side display unit.

8. The recording medium according to claim 6, wherein the process further comprises:

transmitting to the presenter terminal device the generated screen image; and displaying the transmitted screen image on the presenter-side display unit.

9. The recording medium according to claim 6, wherein the processes further comprises:

displaying cut screen objects stored in the edit screen information storage unit on the participant-side display unit;

receiving selection at least one of the displayed cut screen objects; and displaying, on the participant-side display unit, a note edit screen in which the selected cut screen object is incorporated.

10. The recording medium according to claim 9, wherein when there are a plurality of note edit screens, in each of which the selected cut screen object is incorporated, the plurality of note edit screens are displayed on the participant-side display unit as thumbnails, and at least one of the plurality of note edit screens is selected to be displayed.

11. An electronic conference support method executed by a participant terminal device included in an electronic conference system comprising a presenter terminal device that is used by a presenter and to which a presenter-side display unit is connected, the participant terminal device that is used by a participant and to which a participant-side display unit is connected, and a cut screen information management section that stores information related to a cut screen object which forms a portion of a screen image displayed on the presenter-side display unit, the cut screen object being a portion of the screen image formed by being enclosed by an electronic pointing device, the method comprising:

receiving a screen image displayed on the presenter-side display unit and displaying the received screen image on the participant-side display unit;

receiving a cut screen object designated from among cut screen objects contained in a screen image displayed on the participant-side display unit, the designated cut screen object being a portion of the screen image formed by being enclosed by an electronic pointing device;

generating, in response to receiving the designated a cut screen object, a new display image on the participant-side display unit;

generating a screen image based on stored information related to the designated cut screen object;

incorporating generated screen image into the newly generated display image on the participant-side display unit; and storing information related to the newly generated display image and information related to the cut screen object incorporated into the newly generated display image, in association with each other.

12. An electronic conference support device comprising:

a cut screen information management section that stores information related to a cut screen object which forms a portion of a screen image displayed on a presenter-side display unit, the cut screen object being a portion of the screen image formed by being enclosed by an electronic pointing device;

a screen image generation processor, in response to designating a cut screen object from among cut screen objects contained in a screen image displayed on a participant-side display unit, that generates a new display image on the participant-side display unit, generates a screen image based on stored information related to the designated cut screen object, and incorporates the generated screen image into the newly generated display image on the participant-side display unit; and display unit that displays the newly generated display image with the generated screen image incorporated therein.

* * * * *